March 21, 1961 J. D. HENRY 2,976,056
BICYCLE SUSPENSION SYSTEM
Filed June 4, 1958 2 Sheets-Sheet 1

INVENTOR
J. Dan Henry
BY
ATTORNEYS

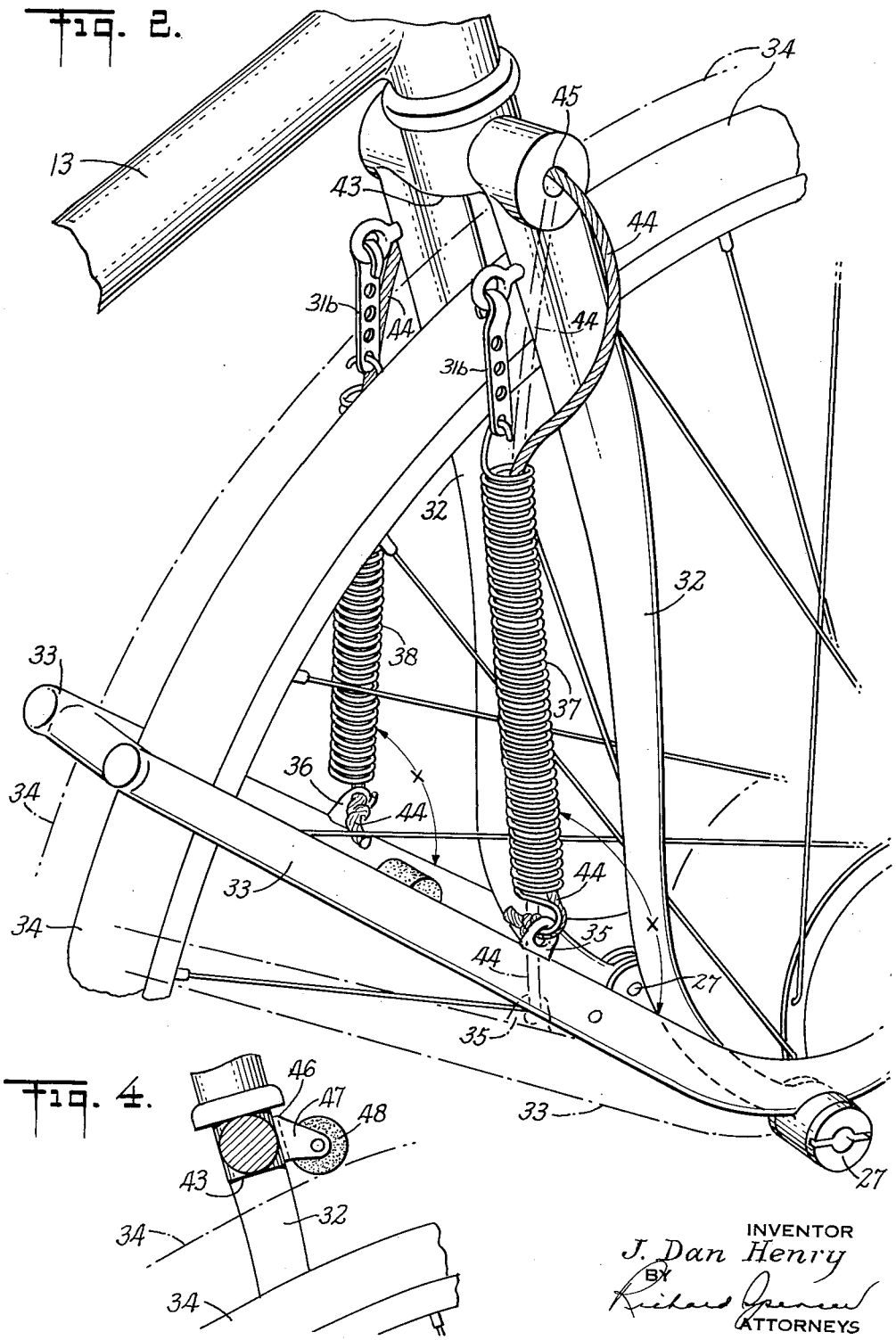

2,976,056
BICYCLE SUSPENSION SYSTEM

John D. Henry, 35—15 155th St., Flushing, N.Y.

Filed June 4, 1958, Ser. No. 739,839

2 Claims. (Cl. 280—277)

This invention relates to bicycles and more particularly to a new and improved bicycle suspension system.

In the prior art, there are many attempts at suspending a bicycle frame to provide shock absorber suspension. Most of the devices of the prior art suffer from one major defect or another. In some of the prior art devices there is a colorable attempt at shock absorber suspension without accomplishing effective shock absorber action. In some prior art devices, only the front wheel is provided with shock absorber suspension. In others, effective shock absorber action is accomplished but only at the expense of safety and/or controllability of the bicycle during use. In others the device is complex and heavy and thus results in the addition of excessive weight to the bicycle.

Accordingly, an object of my invention is to provide a simple bicycle suspension system which provides effective shock absorber action without interfering with the operation of the bicycle or the safety of the operator.

Other objects and many of the attendant advantages of my invention will be readily appreciated as the same becomes better understood by reference to the following detailed description when considered in connection with accompanying drawings in which like reference numerals designate like parts throughout the figures thereof and wherein:

Figure 4 illustrates an alternate wheel stop mechanism.

Figure 5 is a detail view of the chain length compensator shown in Figures 1 and 3.

Figure 1:
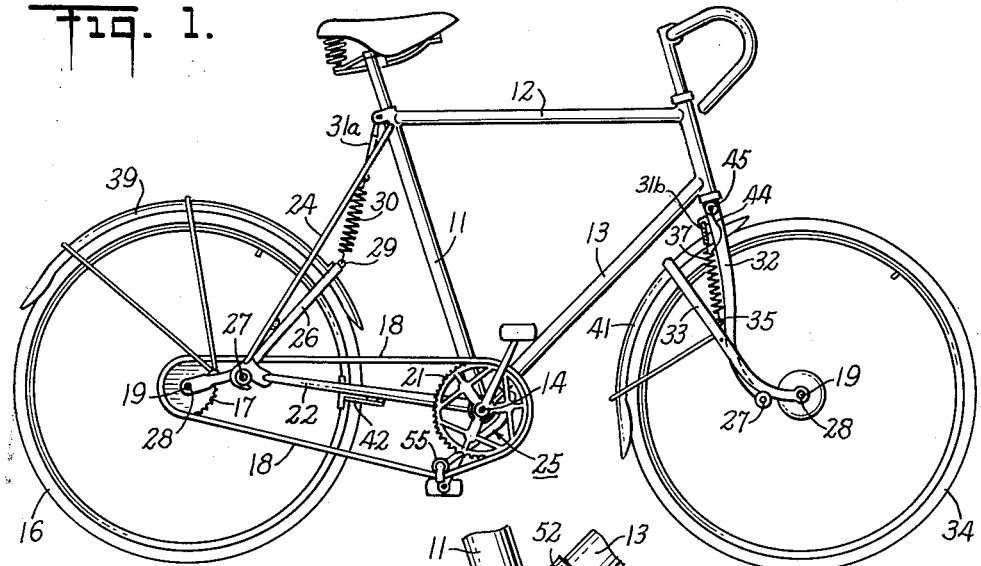
Figure 1 is a side elevation of a bicycle employing a suspension system according to my invention.

Referring now to the drawings, wherein like reference characters designate like or corresponding parts throughout the several views, there is shown in Figure 1, a frame of a bicycle consisting of frame bars 11, 12 and 13 arranged in triangular form. The crank axle 14 (as clearly shown in Figure 5) is journaled in bearings 15 at the junction of frame bars 11 and 13. The driving road wheel 16 is provided with a sprocket wheel 17 for engaging the drive chain 18 and is mounted to revolve on pin 19 when the crank axle sprocket 21 is rotated. A bar 22 called the "chain stay," connects the hub 23 of the crank axle 14 to the rear frame fork 24. A chain length compensator 25 may be connected to the frame bar 13, the hub 23 or the chain stay 22 and engages the drive chain 18 to maintain proper chain tension under all operating conditions.

An arcuate U-shaped rocking fork 26 is provided with fulcrum pins 27 on either side of the road wheel 16. The pins 27 connect the frame fork 24 to the rocking fork 26. These members are secured by suitable means but are free to rotate relative to one another. At the open end of the rocking fork there are two holes 28 which accommodate the wheel pin 19 and the pin is secured by conventional fastening means to the rocking fork. The rocking fork 26 is provided with an eye 29, or other suitable fastening device, which engages one end of the spring 30. The other end of the spring is attached to the frame by a turnbuckle 31a or other suitable adjustable fastening means such as a link 31b provided with a series of apertures as more clearly shown in Figure 2. The turnbuckle 31a may be attached to the frame fork 24, the frame bar 11, an extension of the frame bar 12 or to the seat clamp bolt, as shown.

Figure 2:
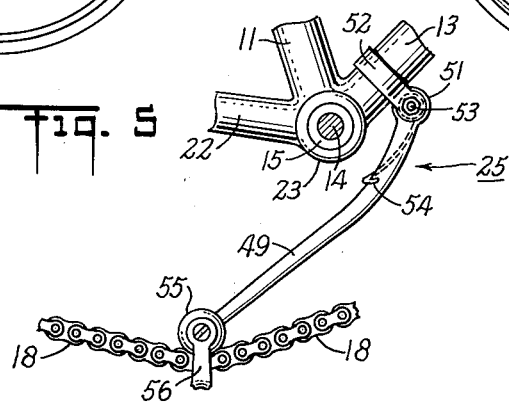
Figure 2 is a view in perspective of the front wheel in Figure 1 showing the wheel stop mechanism and rocking fork arrangement in detail.

Referring now to Figure 2, the front frame fork 32 is connected to the front rocking fork 33 in the same manner as the rear frame fork is connected to the rear rocking fork. Likewise, the front road wheel 34 is connected to the front rocking fork 33 in the same manner as the rear road wheel is connected to the rear rocking fork. Front rocking fork 33 is provided with two eyes 35 and 36 which engage the ends of springs 37 and 38. The other ends of the springs are attached to the frame fork by suitable fastening means 31b as shown. The eyes, 35 and 36 provided on either side of the rocking fork, are located, as such, to avoid any interference between the springs and the road wheel during movement of the rocking fork when the bicycle is in use.

Figure 3:
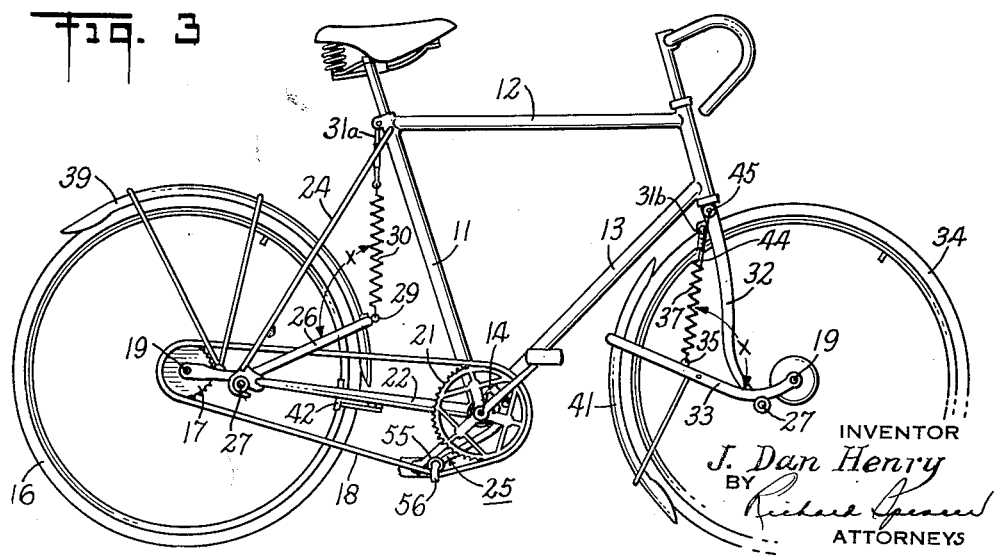
Figure 3 is a view similar to Figure 1 but shows the bicycle when subjected to maximum road shock.

In operation the forks 26 and 33 rock on the pins 27 as the road wheels 16 and 34 move over a rough road; and the springs 30, 37 and 38 absorb the shocks of the road. With reference to the rear road wheel the fork 26 is biased by a spring or other resilient means, so that under maximum shock the rocking fork movement is limited as shown in Figure 3. The movement of the rear rocking fork must be limited so that the included angle (angle X) between the fork 26 and the spring 30 is greater than 90°. In addition the angle between the rocking fork and the spring, at no load, as shown in Figure 1, is greater than 90° but preferably less than 180°. When these conditions are satisfied, the bicycle is effectively suspended to afford maximum shock absorber action. The front rocking fork 33 rocks about pin 27 in much the same manner as the rear rocking fork. The critical angles mentioned above with regard to the rear rocking fork and spring are likewise mentioned by the front rocking fork and springs.

The mud guards 39 and 41, as shown in Figures 1 and 3, are connected to the rocking forks 26 and 33 respectively. The mud guards move with the rocking forks and thus a fixed distance between the road wheels and the mud guards is maintained at all times. When the braking system includes a rear wheel rim brake, as shown, the caliper brake clamps 42 are mounted on the chain stay 22 in a position to make contact with the rim of the wheel. At this position on the chain stay the movement of the wheel relative thereto is small and the rim brake may be operated at all times regardless of rocking fork movement.

The position of the road wheel when the rocking fork is subjected to road shock is indicated by the dotted lines in Figure 2. The movement of the front road wheel 34 with respect to the front frame fork 32 must be limited to prevent the road wheel from striking the neck 43 of the frame fork 32. For this purpose, a nylon cord 44 or the like is attached to the rocking fork on both sides, passes through springs 37 and 38, and then through a passage 45 provided on the frame fork 32. The cord 44 prevents the road wheel 34 from striking the fork neck 43 by limiting the movement of the rocking fork 33. Figure 4 shows another device which may be employed to prevent the road wheel 34 from striking the neck 43 of the front frame fork 32. The device includes a bracket 46 provided with supporting members 47 for holding a wheel 48, which is free to rotate on its axis. The device is secured to the frame fork 32 by screws or other suitable fastening means as shown. When the rocking fork 33 moves under the influence of road shock, the front road wheel 34 moves toward the neck 43 of the frame fork. The wheel 48 is positioned below the surface of the neck 43 to prevent contact between the road wheel 34 and the frame fork neck.

Referring now to Figure 5, the chain length compensator 25 comprises an arm 49 which terminates in a hub 51. The hub 51 is rotatably mounted on a bracket 52 by means of a pin 53. A spring 54 is connected between the bracket 52 and the arm 49 and the latter is under tension by the spring. At the other end of the arm 49 a chain wheel 55 is connected to the arm and is free to rotate about its axis. A U-shaped member 56 is also connected to the end of the arm 49 to provide a guide for the chain 18. The compensator 25 may be connected to the frame bar 13, the chain stay 22 or the axle hub 23. The wheel 55, which may be provided with teeth, engages the chain and the chain guide 56 helps maintain the chain 18 in alignment with the chain wheel 55. When the bicycle is in use the rocking forks, carrying the road wheels, pivot on fulcrum pins 27 so that the wheel pins 19 circumscribe an arc. The effective distance between the wheel sprocket 17 and the crank axle sprocket 21 varies, increasing and decreasing the effective chain length requirements. The spring 54 urges the arm 49 and wheel 55 against the chain 18 thereby reducing any slack imparted to the chain upon movement of the rocking fork.

Thus I have provided a simple bicycle suspension system which is capable of absorbing severe road shocks without interfering with the safety of the operator, the controllability of the bicycle or the operation of the various members during use. By providing adjustable spring fastening means the bicycle may easily accommodate various loads while still maintaining the critical angle requirements according to my invention.

Various modifications are contemplated and may be obviously be resorted to by those skilled in the art without departing from the spirit and scope of the invention as hereinafter defined by the appended claims, as only a preferred embodiment thereof has been disclosed.

What I claim and desire to protect by Letters Patent of the United States is:

1. A suspension system for a bicycle having a driving chain to the rear wheel comprising in combination, a rear rocking fork journaled to the rear frame fork of the bicycle, said rear rocking fork supporting the rear wheel of the bicycle on one side of said journal, first resilient means suspending said rear rocking fork from the bicycle frame and connected to said rear rocking fork on the other side of said journal, said first resilient means having strength sufficient to maintain an angle between said first resilient means and said rear rocking fork of greater than 90° and less than 180° during bicycle use, a front rocking fork journaled to the front frame fork of the bicycle, said front rocking fork supporting the front wheel of the bicycle on one side of said journal, said front frame fork provided with rocking fork limiting means to prevent the front wheel from striking said front frame fork, second resilient means suspending said front rocking fork from the bicycle frame and connected to said front rocking fork on the other side of said journal, said second resilient means having strength sufficient to maintain an angle between said second resilient means and said front rocking fork of greater than 90° and less than 180° during bicycle use, and a chain length compensator for adjusting the effective length of the driving chain upon movement of the rear rocking fork.

2. The combination according to claim 1 further defined in that said first and second resilient means are connected to the bicycle frame by adjustable fastening means.

References Cited in the file of this patent

UNITED STATES PATENTS

| | | |
|---|---|---|
| 1,000,115 | Oquist | Aug. 8, 1911 |
| 1,077,105 | Stewart | Oct. 28, 1913 |
| 1,333,449 | Russell | Mar. 9, 1920 |
| 1,700,631 | Festini | Jan. 29, 1929 |

FOREIGN PATENTS

| | | |
|---|---|---|
| 141,701 | Great Britain | Aug. 17, 1920 |
| 108,178 | Switzerland | Jan. 2, 1925 |